(12) United States Patent  
Higgins

(10) Patent No.: US 9,077,639 B2  
(45) Date of Patent: Jul. 7, 2015

(54) MANAGING DATA TRAFFIC ON A CELLULAR NETWORK

(71) Applicant: Arbor Networks, Inc., Burlington, MA (US)

(72) Inventor: Bradley J. Higgins, Ann Arbor, MI (US)

(73) Assignee: Arbor Networks, Inc., Burlington, MA (US)

( * ) Notice: Subject to any disclaimer, the term of this patent is extended or adjusted under 35 U.S.C. 154(b) by 100 days.

(21) Appl. No.: 14/082,808

(22) Filed: Nov. 18, 2013

(65) Prior Publication Data

US 2015/0138985 A1 May 21, 2015

(51) Int. Cl.
*H04L 12/803* (2013.01)
*H04W 28/02* (2009.01)
*H04L 12/927* (2013.01)

(52) U.S. Cl.
CPC ......... *H04L 47/122* (2013.01); *H04W 28/0252* (2013.01); *H04L 47/808* (2013.01)

(58) Field of Classification Search
None
See application file for complete search history.

(56) References Cited

U.S. PATENT DOCUMENTS

| | | | |
|---|---|---|---|
| 2006/0092841 A1* | 5/2006 | Lloyd et al. | 370/231 |
| 2008/0109891 A1* | 5/2008 | Greenwald et al. | 726/13 |
| 2008/0155694 A1* | 6/2008 | Kwon et al. | 726/23 |
| 2012/0060218 A1* | 3/2012 | Kim et al. | 726/23 |
| 2012/0079592 A1* | 3/2012 | Pandrangi | 726/22 |
| 2012/0147753 A1* | 6/2012 | Jayawardena et al. | 370/238 |
| 2014/0310811 A1* | 10/2014 | Hentunen | 726/23 |

* cited by examiner

*Primary Examiner* — Kerri Rose

(74) *Attorney, Agent, or Firm* — Locke Lord LLP; Scott D. Wofsy; Christopher J. Capelli

(57) ABSTRACT

A method and system for managing data traffic on a cellular network. The method and system includes detecting that an internet service is experiencing excessive amounts of data traffic from a cellular network. Sending, to a cellular device on the cellular network, a modified IP address for the internet service, wherein the modified IP address points away from the internet service. The modified IP address is sent in response to detecting that the internet service is experiencing excessive amounts of traffic from a cellular network and detecting a DNS query from the cellular device for the internet service.

18 Claims, 3 Drawing Sheets

MANAGING DATA TRAFFIC ON A CELLULAR NETWORK

FIELD OF THE INVENTION

The present invention relates to protecting networks, and more particularly, to protecting a cellular network from excessive data traffic.

BACKGROUND OF THE INVENTION

Managing internet access for internet-enabled cellular devices remains an underdeveloped and sometimes problematic field. For example, if excessive traffic to a network is detected, such as might happen if an internet service is down, cellular devices may overwhelm their cellular network with attempted communications.

Accordingly, there is an unmet need for systems and methods for protecting and managing data traffic on cellular networks.

SUMMARY OF THE INVENTION

The purpose and advantages of the below described illustrated embodiments will be set forth in and apparent from the description that follows. Additional advantages of the illustrated embodiments will be realized and attained by the devices, systems, and methods particularly pointed out in the written description and the claims herein, as well as from the drawings.

To achieve these and other advantages and in accordance with the purpose of the illustrated embodiments, described herein are systems and methods for monitoring and managing cellular network traffic. In one embodiment, the system detects excessive traffic to an internet service, and the system responds by sending a modified loopback IP address for the internet service to subsequent DNS requests related to the internet service. Later, such as when the internet service is fully functioning, DNS requests are responded to with an accurate IP address.

BRIEF DESCRIPTION OF THE DRAWINGS

So that those having ordinary skill in the art, to which the present embodiments pertain, will more readily understand how to employ the novel system and methods, certain illustrated embodiments thereof will be described in detail hereinbelow with reference to the drawings, wherein.

DETAILED DESCRIPTION OF CERTAIN EMBODIMENTS

Figure 1:
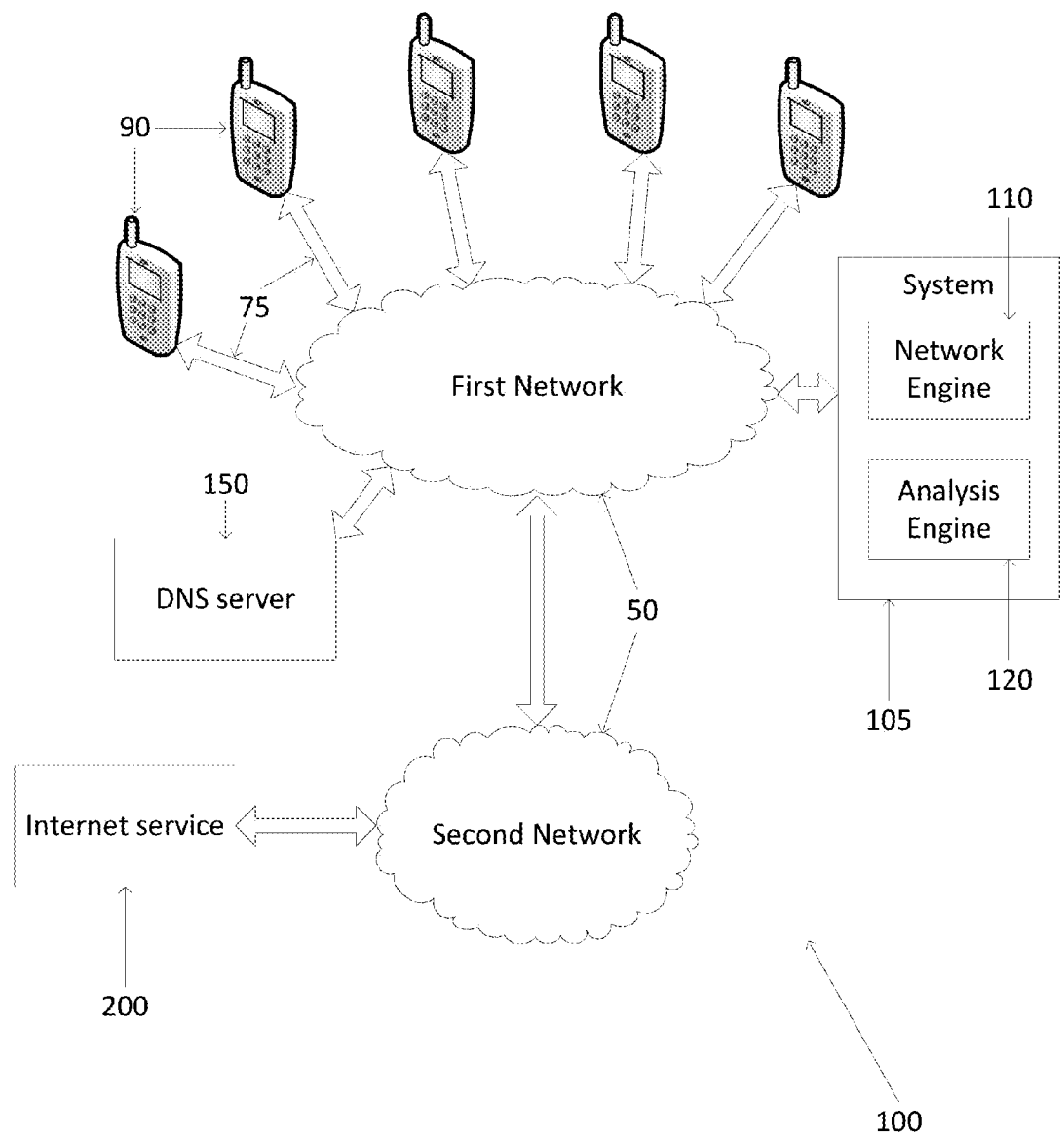
FIG. 1 illustrates a system diagram of an exemplary embodiment of a system for managing network traffic on a cellular network.

The below illustrated embodiments are directed to systems and methods for managing network traffic on a cellular network by sending a modified IP address in response to a DNS request. It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" may include a plurality of such stimuli and reference to "the signal" may include reference to one or more signals and equivalents thereof as known to those skilled in the art.

It is to be appreciated the certain embodiments described herein may be utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be executed by a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the certain embodiments described herein. Thus the certain embodiments are not to be understood to be limited by what has been particularly shown and described, except as indicated by the appended claims.

The methods described herein allow users to, in an exemplary use, monitor network traffic on a cellular network and detect if there is excessive traffic to an internet service and/or server. If excessive traffic is detected, subsequent DNS requests for the internet service's IP address are responded to with a modified IP address, such as a loopback IP address. Devices that receive these modified IP addresses thus no longer generate network traffic when attempting to communicate with the internet service. Later, such as after the internet service and/or server is fully functioning again, DNS requests for the internet service's address are responded to with a correct IP address.

Referring to FIG. 1, a hardware diagram depicting a system 100 in which the processes described herein can be executed is provided for exemplary purposes. In one embodiment, system 100 includes management module 105 that includes networks 50, communications 75, network engine 110 and analysis engine 120. System 100 further includes devices 90, DNS server 150 and internet service 200.

Figure 2:
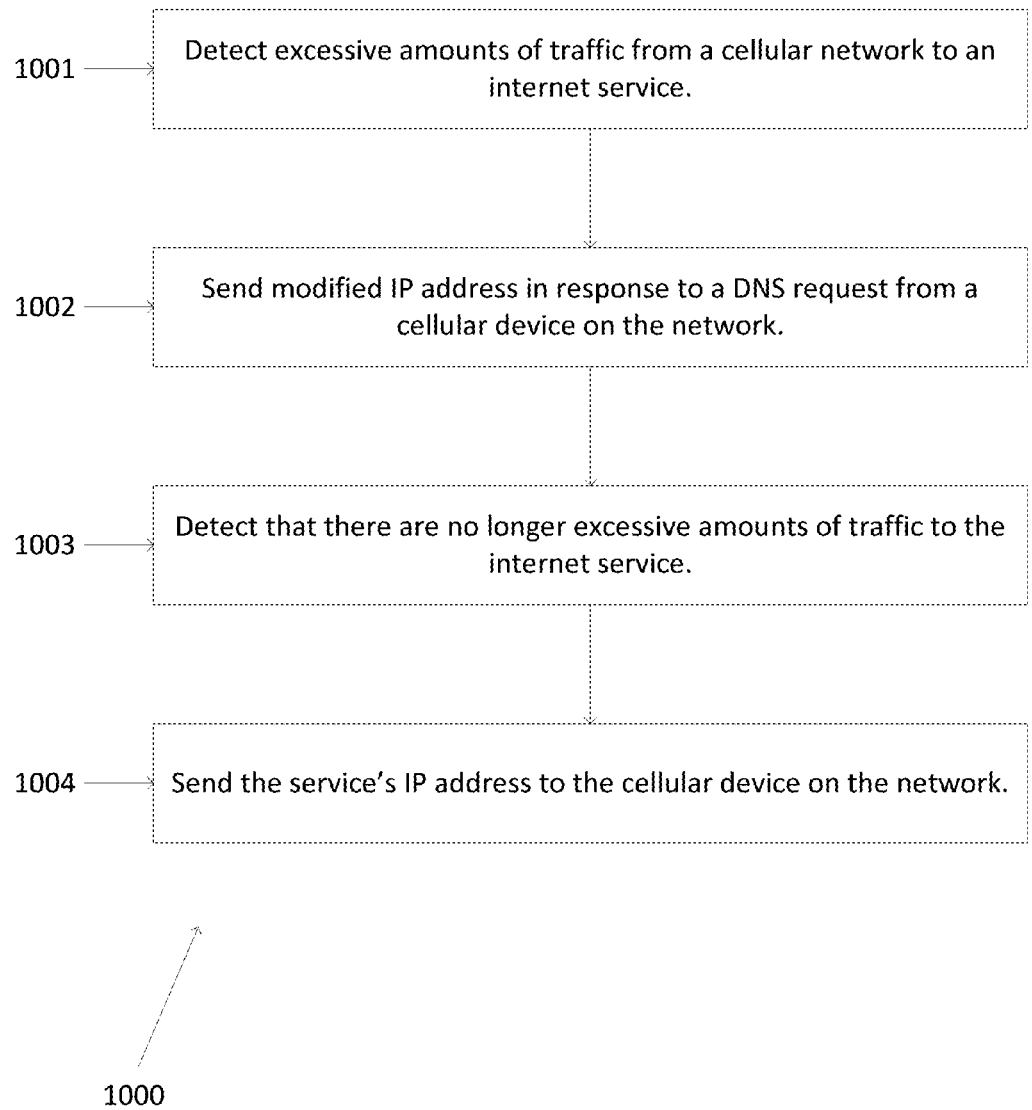
FIG. 2 is a flow chart illustrating an exemplary use of the embodiment of FIG. 1.

Turning to FIG. 2, illustrated therein is in an exemplary process 1000 of utilizing system 100. Starting at step 1001, network engine 110 monitors network traffic on first network 50, and analysis engine 120 detects whether excessive traffic is being sent to an internet service.

In one embodiment, excessive traffic may be detected to be an abundance of TCP Syn Packets. For exemplary purposes only, an abundance of TCP Syn Packets may happen if one or more servers that service the internet domain are not responding (e.g., if the servers that service Gmail® are down, after a cellular device detects no response from its stored address for the Gmail® services, the cellular device may attempt to reconnect to the Gmail® service). Continuing with the example, if Gmail® servers are not properly functioning (e.g., completely unresponsive, partially/mostly unresponsive) then for a given cellular network, all/many of the cellular devices that check Gmail® accounts may send a TCP Syn packet for the Gmail® domain. These constant attempts to interact with a non-functioning service may overwhelm a network, such as a cellular network.

In one embodiment, excessive traffic to an internet domain/service is detected by monitoring a large number of "SYN" TCP packets being sent from cellular devices to an internet server/domain/service, wherein the "large number" may be as compared to historical levels and/or predetermined levels. In another embodiment, excessive traffic to an internet domain/service is detected by monitoring a large number of "RST" TCP packets being sent from cellular devices to an internet server/domain/service, wherein the "large number" is again as compared to historical levels and/or predetermined levels. In yet another embodiment, periodic tests are sent to domains/services that are being utilized by devices on the network, and when one or more of the tests indicate the domain is not responsive, then that indicates that the domain/service is down. In even another embodiment, management system 105 may receive input, from another system and/or party, indicating that a domain/service is down.

Therefore, to protect the network, management system 105 may respond to a DNS request with a modified IP address (step 1002) that is a loopback IP address (e.g., an IPv4 address in the IPv4 block 127.0.0.0/8, a IPv6 loopback of "::1"). In one embodiment, the DNS response has a relatively short Time To Live (TTL), e.g., one minute (for comparison, in some real-world environments the TTL for the DNS cache at the device level is ten minutes). However, it is contemplated herein that the DNS response's TTL may be any amount of time as would be recognized by those skilled in the art.

Thus, if and when a cellular device requests an IP address for an internet domain for a domain with server(s) that are unresponsive, that cellular device may receive a loopback IP address (be it IPv4, IPv6, or any communications format/protocol as is or will be known and used). After which, when that cellular device attempts to contact the internet domain/service, the IP address will point to the cellular device itself. This will result in communication attempts to the internet domain/service not affecting, or even entering, the device's network (e.g., their cellular network).

In one embodiment, management system 105 sends modified IP address by updating DNS server 150. For exemplary purposes only and without limitation, if a cellular network utilizes DNS server 150 that is owned, or at least partially controlled, by the same entity operating the cellular network, management system 105 may update the IP address of a specific IP domain. For illustrative purposes only, suppose that one or more Gmail® servers are unresponsive, resulting in a non-functional Gmail® service. Whereas a DNS request for gmail.com may otherwise resolve to the following (currently) correct IPv4 address 74.125.228.117, after management system 105 detects that Gmail® servers are unresponsive, the DNS server will be reconfigured to respond to DNS requests for gmail.com with an IP address such as 127.0.0.1. However, as noted above, although this example utilizes "127.0.0.1" for an IPv4 loopback IP address, it is recognized herein that any IPv4 address within 127.x.y.z may be utilized, wherein 0≤x≤255, and wherein 0≤y≤255, and wherein 0≤z≤255, and thus, it is contemplated herein that any loopback IP address may be utilized, be it IPv4, IPv6, or any new communications protocol that may be utilized and/or developed.

In another embodiment, an internet domain/service is detected to be not functioning properly (e.g., non-responsive), and a DNS request for that internet domain is detected. In this embodiment, the DNS request is allowed to proceed to the DNS server, and the response from the DNS server is modified to include a loopback address (e.g., "::1"). In another embodiment, after an internet domain/service is detected to be not functioning properly, a DNS request is intercepted before it can reach a DNS server, and a DNS response is sent to the originating device of the DNS request, the DNS response indicating a loopback address for the requested internet domain/server. In still another embodiment, the DNS request may be allowed to proceed to a DNS server (e.g., DNS server 150), but the response is intercepted and replaced with a new DNS response that contains the desired IP address. However, it is contemplated herein that a modified IP address may be returned to a DNS querying cellular device via any means as would be recognized by those skilled in the art, including, without limitation and for exemplary purposes only, the methods and embodiments described herein. It is further contemplated herein that the DNS requests may relate to any type of communications record, including, for exemplary purposes only and without limitation, A records and MX records in the IP protocol.

It is contemplated herein that internet services may include, for exemplary purposes only and without limitation, email (e.g., POP, SMTP, other means as known and/or used), chat, such as instant chat, texting, interacting with websites, cellular applications interacting over the internet and/or any network, and any interaction over computer networks.

It is further contemplated herein that the illustrated embodiments described herein may be utilized even if the target internet service is not down. For exemplary purposes only, if a particular service is functioning normally but the amount of traffic is exceeding or coming close to exceeding the network's stress levels, the systems and methods described herein may be utilized to temporarily halt and/or minimize stress on the network that relates to the target IP service.

Returning back to FIG. 2, when internet servers/service becomes responsive and/or functional again, management system 105 detects the same (step 1003). When this happens, subsequent DNS requests by cellular devices will be responded to with a correct IP address for the requested internet domain (step 1004). For exemplary purposes only, and to complete the above illustrations and embodiments described herein, the correct IP address may be sent by updating a DNS server to identify an accurate IP address, ceasing modifications of DNS responses to contain a loopback address, and/or ceasing interceptions of DNS requests/responses. In short, after step 1004, in at least one embodiment, DNS functionality is returned to normal operating procedure.

Figure 3:
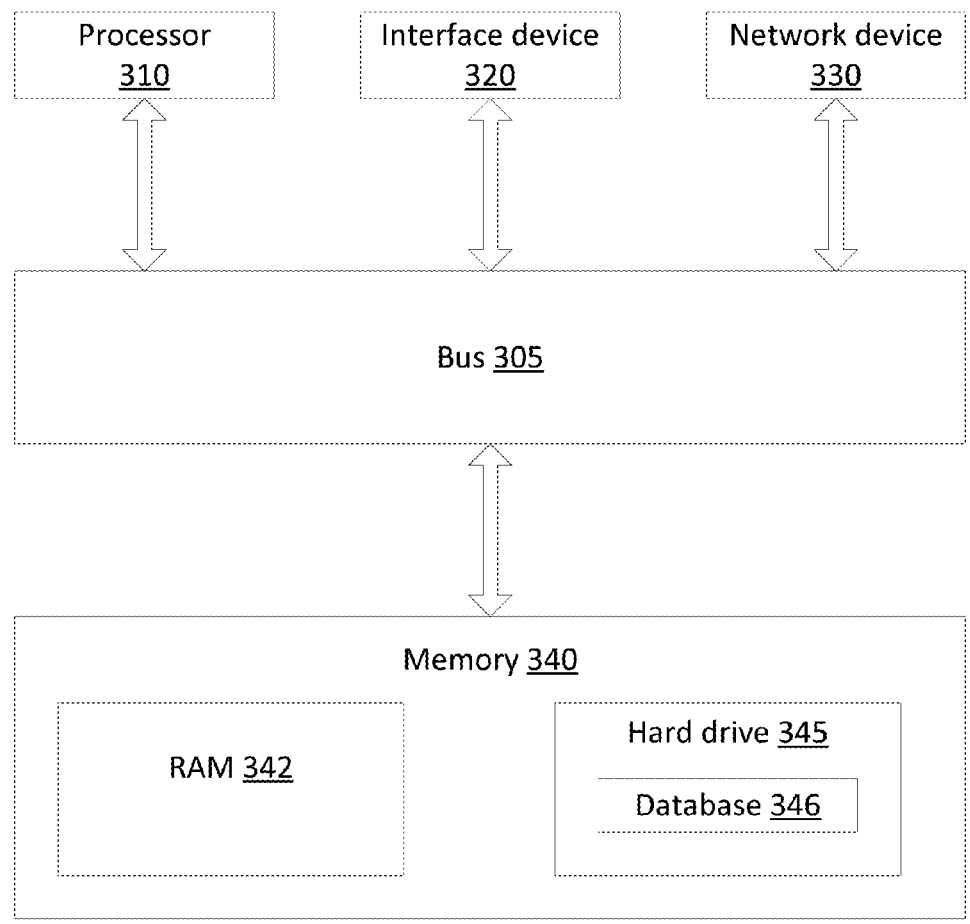
FIG. 3 is an illustration of an embodiment of a computing device.

Turning now to FIG. 3, illustrated therein is an exemplary embodiment of computing device 300 that preferably includes bus 305, over which intra-device communications preferably travel, processor 310, interface device 320, network device 330, and memory 340, which preferably includes RAM 342 and hard drive 345, which may include database 346.

Management module 105 preferably includes computing device, and the components thereof. For example, in FIG. 1, management module 105 preferably comprises a desktop computer, a server, and/or functionally similar computing device.

The term "module"/"engine" is used herein to denote a functional operation that may be embodied either as a standalone component or as an integrated configuration of a plurality of subordinate components. Thus, "modules"/"engines" may be implemented as a single module or as a plurality of modules that operate in cooperation with one another. Moreover, although "modules"/"engines" may be described herein as being implemented as software, they could be implemented in any of hardware (e.g. electronic circuitry), firmware, software, or a combination thereof.

Memory 340 is a computer-readable medium encoded with a computer program. Memory 340 stores data and instructions that are readable and executable by processor 310 for controlling the operation of processor 310. Memory 340 may be implemented in random access memory 342 (RAM), a non-transitory computer readable medium, volatile or non-volatile memory, solid state storage devices, magnetic devices, hard drive 345, database 346, a read only memory (ROM), or a combination thereof.

Processor 310 is an electronic device configured of logic circuitry that responds to and executes instructions. Processor 310 outputs results of an execution of the methods described herein. Alternatively, processor 310 could direct the output to a remote device (not shown) via network 50.

Although in the illustrated embodiment of FIG. 1, first network preferably comprises a LAN and second network preferably comprises a WAN, it is to be appreciated that each of networks 50 depicted in FIG. 1 can include a local area network (LAN) and a wide area network (WAN), other networks such as a personal area network (PAN), or any combination thereof. Further, each network 50 in FIG. 1 may include the exact same network configurations, completely different network configurations, or any combination thereof. Such networking environments are commonplace in offices, enterprise-wide computer networks, intranets, and the Internet. For instance, when used in a LAN networking environment, the system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. It is to be appreciated that the illustrated network connections of FIG. 1 are exemplary and other means of establishing a communications link between multiple computers may be used.

It should be understood that computing devices 300 each generally include at least one processor, at least one interface, and at least one memory device coupled via buses. Computing devices 300 may be capable of being coupled together, coupled to peripheral devices, and input/output devices. Computing devices 300 are represented in the drawings as standalone devices, but are not limited to such. Each can be coupled to other devices in a distributed processing environment.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprise", "include", and conjugations thereof are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention as defined by the appended claims.

What is claimed is:

1. A computer-implemented method of managing data traffic on a cellular network comprising:
   detecting that an internet service is experiencing excessive amounts of data traffic from a cellular network; and
   sending, to a cellular device on the cellular network, a modified IP address for the internet service, wherein the modified IP address does not point to the internet service and wherein the modified IP address points to the cellular device, and wherein the modified IP address is sent in response to detecting that the internet service is experiencing excessive amounts of traffic from a cellular network and detecting a DNS query from the cellular device for the internet service.

2. The computer-implemented method of claim 1, wherein the modified IP address is a loopback IP address.

3. The computer-implemented method of claim 2, wherein the loopback IP address is selected from the IPv4 block 127.0.0.0/8.

4. The computer-implemented method of claim 2, wherein the loopback IP address comprises the IPv6 address "::1".

5. The computer-implemented method of claim 2, wherein the step of sending the loopback IP address comprises sending a DNS response to the cellular device, and wherein the DNS response has a Time To Live (TTL) of a predetermined time period.

6. The computer-implemented method of claim 1, further comprising:
   detecting that the internet service is not experiencing excessive amounts of traffic from a cellular network, wherein this detection is subsequent to detecting that the internet service is experiencing excessive amounts of traffic from a cellular network; and
   sending an IP address to the cellular device, wherein the IP address points to the internet service, and wherein the IP address is sent to the cellular device in response to detecting that the internet service is not experiencing excessive amounts of traffic from a cellular network.

7. The computer-implemented method of claim 1, wherein the step of sending a modified IP address comprises:
   configuring a DNS server to resolve DNS queries for the internet service to the modified IP address; and
   sending the modified IP address from the DNS server.

8. The computer-implemented method of claim 1, wherein the step of sending a modified IP address comprises:
   detecting a DNS response that is in response to a DNS query for the internet service;
   modifying the DNS response to include the modified IP address; and sending the modified DNS response.

9. The computer-implemented method of claim 1, wherein the step of sending a modified IP address is performed without forwarding the DNS query to a DNS server.

10. A computer system for managing data traffic on a cellular network, comprising:
   a memory configured to store instructions;
   a processor disposed in communication with said memory, wherein said processor upon execution of the instructions is configured to:
      detect that an internet service is experiencing excessive amounts of data traffic from a cellular network; and
      send, to a cellular device on the cellular network, a modified IP address for the internet service, wherein the modified IP address points away from the internet service and points to the cellular device, and wherein the modified IP address is sent in response to detecting that the internet service is experiencing excessive amounts of traffic from a cellular network and detecting a DNS query from the cellular device for the internet service.

11. The computer system of claim 10, wherein the modified IP address is a loopback IP address.

12. The computer system of claim 11, wherein the loopback IP address is selected from the IPv4 block 127.0.0.0/8.

13. The computer system of claim 11, wherein the loopback IP address comprises the IPv6 address "::1".

14. The computer system of claim 11, wherein the step of sending the loopback IP address comprises sending a DNS response to the cellular device, and wherein the DNS response has a Time To Live (TTL) of a predetermined time period.

15. The computer system of claim 10, wherein said processor upon execution of the instructions is further configured to:
   detect that the internet service is not experiencing excessive amounts of traffic from a cellular network, wherein this detection is subsequent to detecting that the internet service is experiencing excessive amounts of traffic from a cellular network; and
   send an IP address to the cellular device, wherein the IP address points to the internet service, and wherein the IP address is sent to the cellular device in response to detecting that the internet service is not experiencing excessive amounts of traffic from a cellular network.

16. The computer-implemented method of claim 10, wherein sending a modified IP address comprises:
   configuring a DNS server to resolve DNS queries for the internet service to the modified IP address; and
   sending the modified IP address from the DNS server.

17. The computer-implemented method of claim 10, wherein the step of sending a modified IP address comprises:
   detecting a DNS response that is in response to a DNS query for the internet service;
   modifying the DNS response to include the modified IP address; and
   sending the modified DNS response.

18. The computer-implemented method of claim 10, wherein the step of sending a modified IP address is performed without forwarding the DNS query to a DNS server.

* * * * *